United States Patent
Sudharsanan

(10) Patent No.: US 7,075,462 B2
(45) Date of Patent: Jul. 11, 2006

(54) SPEEDING UP VARIABLE LENGTH CODE DECODING ON GENERAL PURPOSE PROCESSORS

(75) Inventor: Subramania Sudharsanan, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 729 days.

(21) Appl. No.: 10/214,043

(22) Filed: Aug. 7, 2002

(65) Prior Publication Data

US 2004/0028140 A1 Feb. 12, 2004

(51) Int. Cl.
*H03M 7/40* (2006.01)

(52) U.S. Cl. .......................... 341/67; 341/61

(58) Field of Classification Search ................ 341/67, 341/61, 50, 60, 87, 51, 63
See application file for complete search history.

(56) References Cited

U.S. PATENT DOCUMENTS

| 5,675,331 A | * | 10/1997 | Watanabe et al. ............. 341/67 |
| 6,167,509 A | * | 12/2000 | Sites et al. .................. 712/237 |
| 6,289,053 B1 | * | 9/2001 | Varanasi et al. ........ 375/240.17 |

OTHER PUBLICATIONS

"Efficient Table Access for Reversible Variable-Length Decoding", By Jennifer L.H. Webb, IEEE Transactions on Circuits and Systems for Video Technology, vol. 11, No. 8, Aug. 2001, pp. 981-985.

"MAJC-5200: A High Performance Microprocessor for Multimedia Computing", By Subramania Sudharsanan, 8 pages, 2000 no month.

* cited by examiner

*Primary Examiner*—John B Nguyen

(57) ABSTRACT

A method for decoding using a general purpose processor, comprising the steps of extracting a bit field from a data stream; extracting one or more properties from the data stream; matching the one or more properties with one or more tags in a content addressable memory; and generating a new address in response to the content addressable memory.

17 Claims, 5 Drawing Sheets

SPEEDING UP VARIABLE LENGTH CODE DECODING ON GENERAL PURPOSE PROCESSORS

FIELD OF THE INVENTION

The present invention relates to microprocessor design generally and, more particularly, to a method and/or apparatus for speeding up variable length code decoding on general purpose processors.

BACKGROUND OF THE INVENTION

The decoding of multiple video stream standards has become an important application for general purpose processors such as MIPS, x86, Sparc, and ARM platforms. However, conventional instruction sets for many general purpose processors are not easily amenable to performing the bit-oriented variable length decode (VLD) process to decode many different compressed video formats such as MPEG-1/2/4, H.263, and the Windows Media Format. Hardwired VLD blocks implemented entirely in core logic involve repeated investment to adopt different standards and can limit the flexibility of high-level programming language for video decoders.

Special properties of variable length code (VLC) are applied for decoding. By definition, the unique prefix property of the variable length code is used for decoding. However, exploiting the unique prefix property alone may limit performance to bit-serial. A direct table look-up can be used to perform the decoding operation. However, with VLC words of up to n bits of length, the table size grows exponentially (i.e., $2^n$). Even in modern processors with high performance memory subsystems, such memory bandwidth is a serious performance detriment.

Some general purpose processors and digital signal processors include instructions to determine the leading number of zeros or the leading number of ones. The instructions can be used for VLD as well as other mathematical computations such as the normalization of a data set. The instructions for determining the leading number of zeros or ones combined with barrel-shift bitfield extraction instructions can improve the speed of variable length code decoding and provide reduced memory requirements. However, the speed provided by these instructions is less than the speed provided by specially designed hardware decoders. However, the disadvantages of using specially designed hardware decoders include the difficulty in providing a simple software abstraction level for high-level coding and the investment of redesigning the processor to accommodate newer video codecs.

With conventional approaches, the leading number of zeros or ones is used to load an intermediate value from a base address and an offset provided by the leading zero or one count. The leading zero count is arithmetically scaled and added to the base address. The value loaded from the base address contains a code word length and a base pointer to another table. The pointer and the variable length portion of the code are used by software to compute a new address. The pointer and part of the extracted bitfield are combined in a way similar to segmented address computation to obtain another address. The new address is used to index the VLC table that contains the decoded information. One disadvantage of the conventional approach is the use of two levels of indirection through the memory hierarchy and the computational overhead to obtain the addresses.

Referring to FIG. 1, an example of a conventional processing scheme 10 for VLC decoding is shown. An instant in an MPEG-4 video decode sequence of the conventional approach is shown. The boxes 12 and 14 represent interactions with the memory subsystem and the boxes 16, 18 and 20 represent software processing with special instructions. A conventional RISC processor with a lead-zero count instruction uses 15 to 18 cycles to perform such a computation. Even in superscalar or very long instruction word (VLIW) implementations, the instructions are difficult to implement in fewer clock cycles because most of the operations are serial in nature. Additionally, the uncertain latencies of the cached memory subsystem are encountered twice. In some architectures this problem is avoided by specifically locking locations of the VLC code table entries. In some processors the number of cycles is higher because the leading zero count determination is implemented through nested conditional loops (i.e., the processors do not have a leading zero count instruction).

It would be desirable to implement variable length decoding in a general purpose processor that uses less than 15 cycles to perform and is easily amendable to various video stream decoding processes.

SUMMARY OF THE INVENTION

The present invention concerns a method for decoding using a general purpose processor, comprising the steps of extracting a bit field from a data stream, extracting one or more properties from the bit field, matching the one or more properties with one or more tags in a content addressable memory and generating a new address in response to the content addressable memory.

The objects, features and advantages of the present invention include a method and/or apparatus for speeding up variable length code decoding on general purpose processors that may (i) implement a translation look-aside buffer structure, (ii) provide a hardware accelerator accessible via instructions in a processor, (iii) provide a significant increase in speed of variable length code decoding in general purpose processors, (iv) be amenable to high level software programming, and/or (v) be easily adapted to multiple existing and future video codec standards.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may provide a hardware accelerator structure and an associated software instruction to access the hardware structure. In one example, a RISC style processor may be configured to place data from a bit-stream queue in one or more registers. Alternatively, a direct access to a bit-stream FIFO may be used for accessing the data. The present invention may be easily controlled with software, easily implemented through hardware, and may provide significant performance improvement for decoding compressed data streams (e.g., video, audio, etc.).

Figure 2:
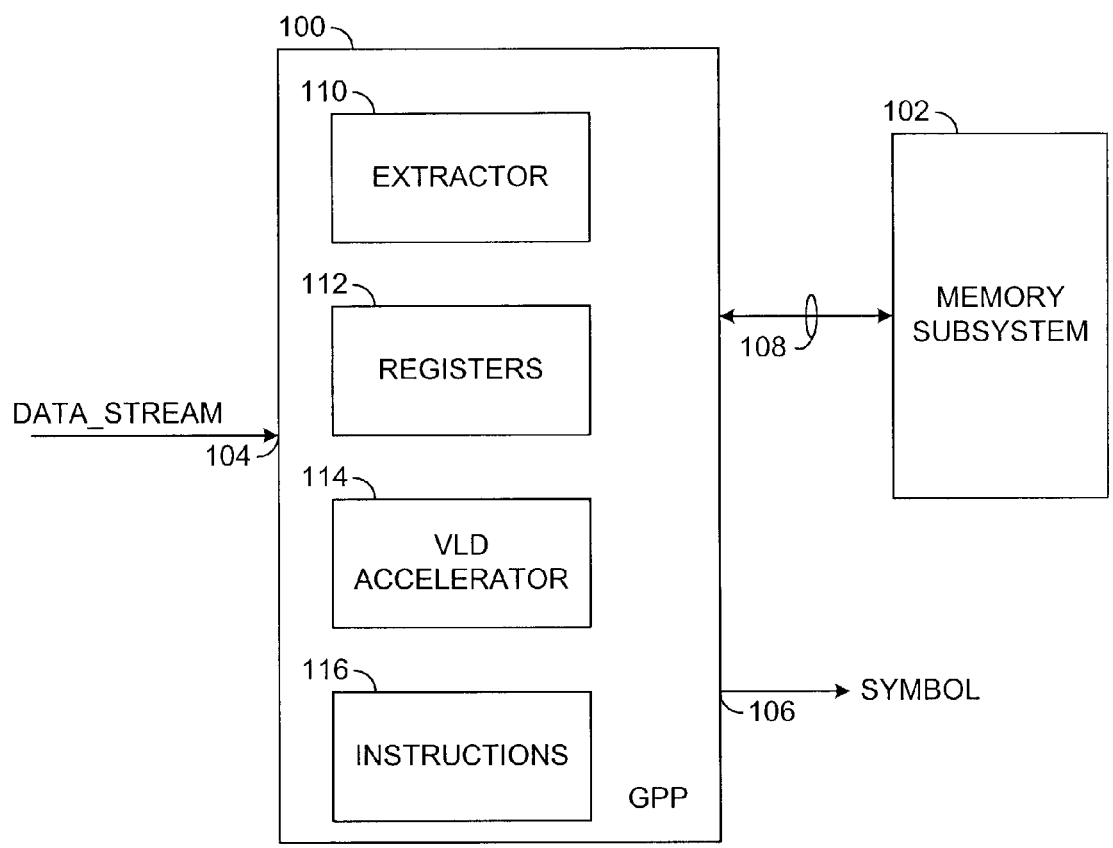
FIG. 2 is a block diagram of a preferred embodiment of the present invention.

Referring to FIG. 2, a block diagram of a circuit 100 is shown illustrating a preferred embodiment of the present invention. The circuit 100 may be implemented, in one example, as a general purpose processor. The circuit 100 may be configured to store and retrieve data from a memory subsystem 102. The circuit 100 may have an input 104 that may receive a signal (e.g., DATA_STREAM), an output 106 that may present a signal (e.g., SYMBOL) and an input/output that may communicate with the memory subsystem 102 via a bidirectional bus 108. The circuit 100 may be configured to extract variable length code values from the signal DATA_STREAM, decode the variable length code values and present the decoded values as unencoded symbols via the signal SYMBOL.

The circuit 100 may comprise a circuit 110, a circuit 112, a circuit 114 and a circuit (or block) 116. The circuit 110 may be implemented as an extractor circuit. The circuit 112 may comprise one or more registers. The circuit 114 may be implemented as a hardware variable length decode (VLD) accelerator. The circuit (or block) 116 may comprise computer executable instructions for controlling the operation of the circuit 100. The circuit 116 may comprise, in one example, microcode, ROM, firmware or other appropriate media for storing instructions for controlling the circuit 100. The circuits 110, 112, 114 and 116 may interact with one another via an internal bus of the circuit 100 (not shown).

The circuit 110 may be configured to extract a bitfield from the signal DATA_STREAM. The extracted bitfield may be placed in a register of the circuit 112. The circuit 114 may be configured to retrieve the bitfield from the register of the circuit 112 and generate an address for retrieving an unencoded symbol from the memory subsystem 102. The instructions 116 may comprise one or more instructions for controlling the extraction of the bitfield, transferring the bitfield to the registers 112 and from the registers 112 to the accelerator 114 and/or controlling the accelerator. The circuit 114 may be updated (or programmed) via software, firmware, etc. to support present and future compression schemes. In an alternative embodiment, the circuit 110 and 114 may be implemented as a single circuit (or block).

The variable length code tables used in video and audio coding generally exhibit properties that may be exploited for faster decoding and smaller memory footprints. One such property is that each code generally has a variable length portion followed by a small fixed length portion. The codes are generally constructed such that once the variable length portion is identified or decoded, the small fixed length portion may be used to index a lookup table. Identification of the variable length portion may comprise, in one example, finding the number of leading zeroes or ones. In some cases, as in MPEG-4 reversible VLC, the number of ones in the code (e.g., a pop count) may be used. An example of an MPEG-4 VLC table for coded block pattern chroma is summarized in the following TABLE 1:

TABLE 1

| Code | MB Type | cbpc |
|---|---|---|
| 1 | 0 | 00 |
| 0011 | 0 | 01 |
| 0010 | 0 | 10 |
| 0001 01 | 0 | 11 |
| 011 | 1 | 00 |
| 0000 111 | 1 | 01 |
| 0000 110 | 1 | 10 |
| 0000 00101 | 1 | 11 |
| 010 | 2 | 00 |
| 0000 101 | 2 | 01 |
| 0000 100 | 2 | 10 |
| 0000 0101 | 2 | 11 |
| 0001 1 | 3 | 00 |
| 0000 0100 | 3 | 01 |
| 0000 0011 | 3 | 10 |
| 0000 011 | 3 | 11 |
| 0001 00 | 4 | 00 |
| 0000 00100 | 4 | 01 |
| 0000 00011 | 4 | 10 |
| 0000 00010 | 4 | 11 |
| 0000 00001 | Stuffing | |

TABLE 1 comprises twenty-one codes. The maximum length of each code is nine bits. Since the VLC table size for a nine bit word is calculated as $2^9$ or 512 entries, the use of the variable length code properties may significantly reduce the table size for decoding operations. For example, the total table entries are reduced from 512 to twenty-two. The possible leading zero counts for 9-bit codewords and a corresponding number of entries in the VLC table possessing a given leading zero count may be summarized in the following TABLE 2:

TABLE 2

| Count of Leading Zeros | Table Entries |
|---|---|
| 0 | 0 |
| 1 | 2 |
| 2 | 2 |
| 3 | 4 |
| 4 | 4 |
| 5 | 4 |
| 6 | 4 |
| 7 | 2 |
| 9 | 1 |

Figure 3:
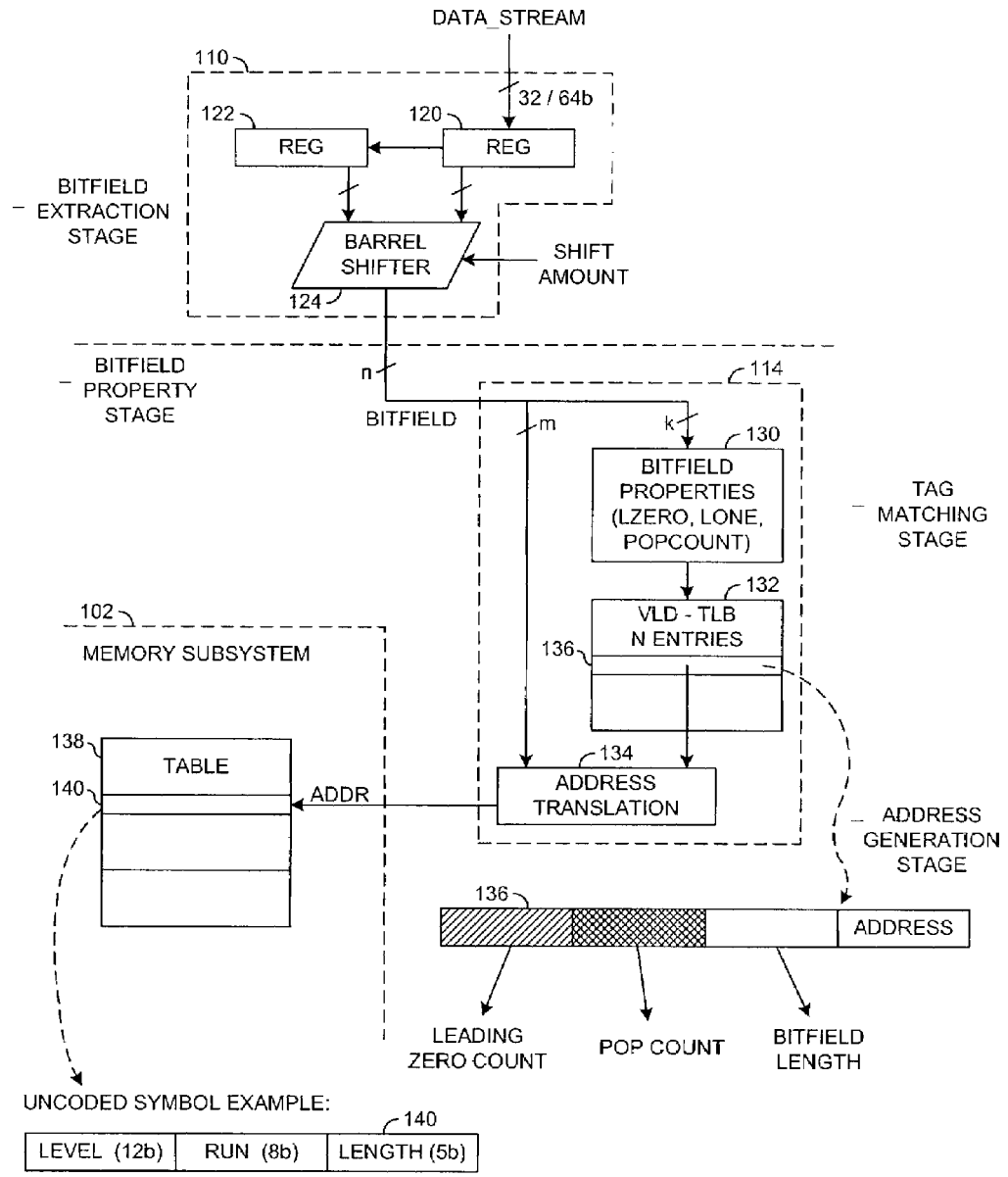
FIG. 3 is a more detailed block diagram of a preferred embodiment of the present invention.

Referring to FIG. 3, a more detailed block diagram of the circuit 100 of FIG. 2 is shown. The circuit 114 may be implemented as a hardware accelerator for performing a fast variable length code (VLC) decode process. In one example, the circuit 110 may comprise a register 120, a register 122 and a barrel shifter 124. The signal DATA_STREAM may be shifted through the registers 120 and 122. The registers 120 and 122 may present bits of the signal bitstream to the barrel shifter 124. In one example, the registers 120 and 122 may be implemented as 32-bit registers. In an alternative example, the registers 120 and 122 may be implemented as 64-bit registers. However, other size registers may be implemented accordingly to meet the design criteria of a particular application.

The barrel shifter 124 is generally configured to move a decoding window across the bit pattern presented by the registers 120 and 122. The barrel shifter 124 generally presents the contents of the decode window as the signal BITFIELD. The signal BITFIELD is generally implemented as a multi-bit signal. In one example, the signal BITFIELD may be implemented as an n-bit signal. The signal bitfield is generally presented to the circuit 114.

The circuit 114 may be configured to generate a signal (e.g., ADDR) in response to the signal BITFIELD. The signal ADDR is generally an address signal (or pointer). The signal ADDR may be presented to the memory subsystem 102 to retrieve an unencoded symbol represented by the encoded value in the signal BITFIELD. The circuit 114 may comprise a circuit 130, a circuit 132 and a circuit 134. The circuit 130 may be implemented as a logic circuit configured to determine properties of the signal BITFIELD. The circuit 132 may be implemented as a memory circuit. In one example, the circuit 132 may comprise a translation lookaside buffer. Alternatively, the circuit 132 may be implemented as a content addressable memory (CAM). The circuit 134 may be implemented as an address translation logic circuit.

The circuit 130 may be configured to determine a number of properties of the signal BITFIELD. For example, the circuit 130 may be configured to determine the number of leading zeros, the number of leading ones and/or the pop count (e.g., number of ones) of the signal BITFIELD. The circuit 130 may be configured to determine one or more of the properties simultaneously. The circuit 130 may have an input that may receive a portion of the signal BITFIELD (e.g., K bits). The circuit 130 may have an output that may present one or more signals (e.g., LZERO, LONE, and POPCOUNT). The signal LZERO may comprise a leading zeroes count. The signal LONE may comprise a leading ones count. The signal POPCOUNT may comprise a pop count. One or more of the signals LZERO, LONE and POPCOUNT may be presented to an input of the circuit 132.

The circuit 132 is generally configured to access a plurality of entries 136 in response to one of the signals LZERO, LONE and POPCOUNT. For example, when the circuit 132 is implemented as a CAM, the circuit 132 may compare one of the signals LZERO, LONE or POPCOUNT to a tag field of each of the entries. For example, an entry 136 may comprise a first field that may contain a leading zero count value, a second field that may contain a pop count value, a third field that may contain a bitfield length value and a fourth field that may contain an address value. When a match occurs between the selected signal LZERO, LONE or POPCOUNT and the selected field of the entry 136, the entry 136 is generally presented at an output of the circuit 132 to an input of the circuit 134.

The circuit 134 may have an input that may receive a second portion (e.g., M bits) of the signal BITFIELD. The circuit 134 is generally configured to generate the signal ADDR in response to the second portion of the signal BITFIELD and an address field of the entry 136 received from the circuit 132. For example, the address field value of the entry 136 may be implemented as a base address. The second portion of the signal BITFIELD may be added (e.g., used as an index) to the address field value to obtain an address for retrieving an unencoded symbol from the memory subsystem 102.

The circuit 100 is generally configured to present the signal ADDR to the memory subsystem 102. The memory subsystem 102 generally contains a table 138 that may be accessed in response to the signal ADDR. The memory subsystem 102 generally presents an entry 140 from the table 138 in response to the signal ADDR. The entry 140 generally comprises a level value, a run value and a length value for an unencoded symbol. The entry 140 pointed to by the signal ADDR is generally returned to the circuit 100. When the circuit 100 receives the unencoded symbol (e.g.,  the entry 140) from the memory subsystem 102, the circuit 100 generally presents the unencoded signal via the signal SYMBOL.

The present invention may provide a decoding process that may be described as having four stages. A first stage may comprise a bitfield extraction stage. A second stage may comprise a bitfield properties determination stage. A third stage may comprise a tag matching stage. A fourth stage may comprise an address generation stage. In the first stage, the data may be arranged in one or more registers 120 and 122. Alternatively, the data may be arranged in a FIFO. A barrel shifter 124 presents data from the registers 120 and 122 to the stage 114. In one example, the first stage may be performed by a barrel shifting bitfield extraction instruction.

In the second stage, the extracted bitfield data may be sent to a block (or circuit) 130 that may extract certain properties of a variable length portion of the bitfield. The properties may comprise a leading zero count, a leading one count, and/or a pop count. The pop count may count how many one bits are in the bitfield. The leading zero count may count the number of leading zeros prior to a one in the bitfield. The leading one count may count the number of leading ones prior to a zero in the bitfield. The second stage may be implemented as a computer executable instruction.

In the third stage, the bit field property may be used to match tags of a content addressable memory. The content addressable memory may be a simple memory such as a translation look-aside buffer (TLB) or tags in a cache system. The memory may be programmed, in one example, at start up and/or each time a different encoding scheme is to be supported.

In the fourth stage, the address portion of the TLB entry may be used in combination with the trailing bits of the bit field (e.g., of length bit field length) to produce a new address. The new address may be used to load a value (e.g., unencoded symbol) from a memory subsystem.

Figure 1:
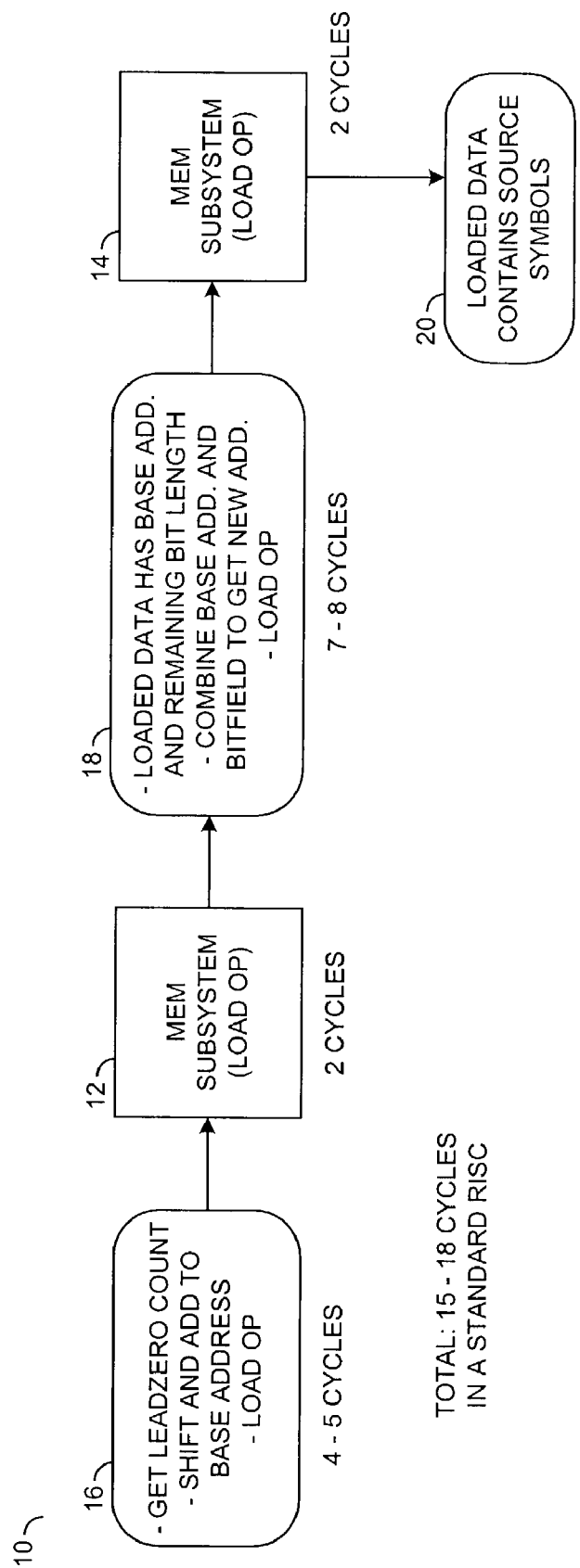
FIG. 1 is flow chart illustrating a conventional VLC decoding process.

With respect to the software, the present invention may provide a simpler and more efficient process than the conventional approach depicted in FIG. 1. The hardware complexity of the current invention may be slightly increased over the conventional approach. However, the present invention may employ familiar system components in a unique structure to create a more flexible hardware accelerator accessible by software instructions. For example, the hardware accelerator may be applicable to any video decoding process. The TLB look up may be performed in response to, in one example, either the leading zero count field or the pop count field. However, both the leading zero count field and the pop count field are generally not used simultaneously. The address generation stage may be implemented with shifters and multiplexers.

The present invention may provide a computer executable instruction and hardware accelerator with a 3 or 4 cycle latency. The present invention may provide a significant improvement over the 15 to 18 cycle latency obtained with the leading zero count instructions of the conventional approach. The hardware accelerator 114 may be software programmable and may accommodate the decoding of different encoding standards such as MPEG-1, 2 and 4, H.26X variants, and proprietary schemes (e.g., schemes from Microsoft Windows Media, Real Networks, etc.). Software instructions may be added to a compiler instruction set to easily make use of the process of the present invention.

In one example, the variants of instructions may be generically applicable to many instruction set architectures. The following is an example of instructions that may be implemented in the present invention. However, the following serves only as a limited example of many instructions that may be implemented to meet the design criteria of a particular application.

The present invention may provide a number of computer executable instructions for accessing the hardware accelerator. A first instruction may be implemented as vldecode_lz rs1, rs2 {imm}, rd. The first instruction may be an instruction that depends on the leading zeros count tag field. The codeword in a register rs1 may be decoded and a decoded symbol may be written to a register rd. A register rs2 may immediately indicate the TLB segment to which the leading zeros count tag values may be compared.

A second instruction may be implemented as vldecode_lo rs1, rs2 {imm}, rd. The second instruction may be an instruction that depends on the leading ones count tag field. The codeword in the register rs1 may be decoded and the decoded symbol may be written to the register rd. The register rs2 may immediately indicate the TLB segment to which the leading ones count tag values may be compared.

A third instruction may be implemented as vldecode_pc rs1, rs2 {imm}, rd. The third instruction may be an instruction that depends on the number of ones count (e.g., pop count) tag field. The codeword in the register rs1 may be decoded and the decoded symbol may be written to the register rd. The register rs2 may immediately indicate the TLB segment to compare with the number of ones tag values. However, other instructions may be implemented to meet the design criteria of a particular implementation.

An example TLB entry in accordance with the present invention may be summarized in the following TABLE 3:

TABLE 3

| 49 | 44 | 43 | 38 | 37 | 32 | 31 | 0 |
|---|---|---|---|---|---|---|---|
| 0x1c Leadzero Count | | xxx PopCount | | 0x02 Bit Length | | 0x00008030 Address | |

In one example, the circuit 100 may be implemented as a 32-bit RISC processor. In one example, there may be nine TLB entries in a coded block pattern segment corresponding to a different leading number of zeroes. The fifth entry may correspond to leading zeroes of five in the code table. The lead zero count entered may not be exactly five since all 9 bits (e.g., the maximum bit-length of the example of TABLE 1) of the bit field may be right justified in a 32-bit register. Hence the entry may be 28, or 0x1Ch in hexadecimal representation. The pop count field may be ignored. The bit length field may indicate that 2 bits beyond the first 1 bit should be used for final address calculation. The TLB match may be based on the lead zero count field.

When, for example, a code word 9'0000_0101_x is present in the bit field register (e.g., right justified in the 32-bit register), the TLB entry shown may be selected and the lead zero count, bit length and address fields may be sent to the address translation unit 134. In the address translation unit 134, the 2 bits beyond the leading one bit may be extracted to produce a combined address of 0x00008034. This address may be used to load the data from the memory into the designated register.

The present invention may be applied to other tables for MPEG-4 video decoding. Tables from other standards may also be represented in this way. Many different VLC tables may be found for one particular standard stream. The method of the present invention described may make use of segments for the TLB entries. Optimizations may be possible to reduce the number of entries. For example, to decode a video sequence, the VLC table entries corresponding to a macroblock and a lower level may need to be kept in the TLB entries. TLB entries in the order of 64 may be sufficient to significantly accelerate video decoding using the scheme described. Alternatively, the present invention may be implemented by building special purpose, programmable VLD engines.

Figure 4:
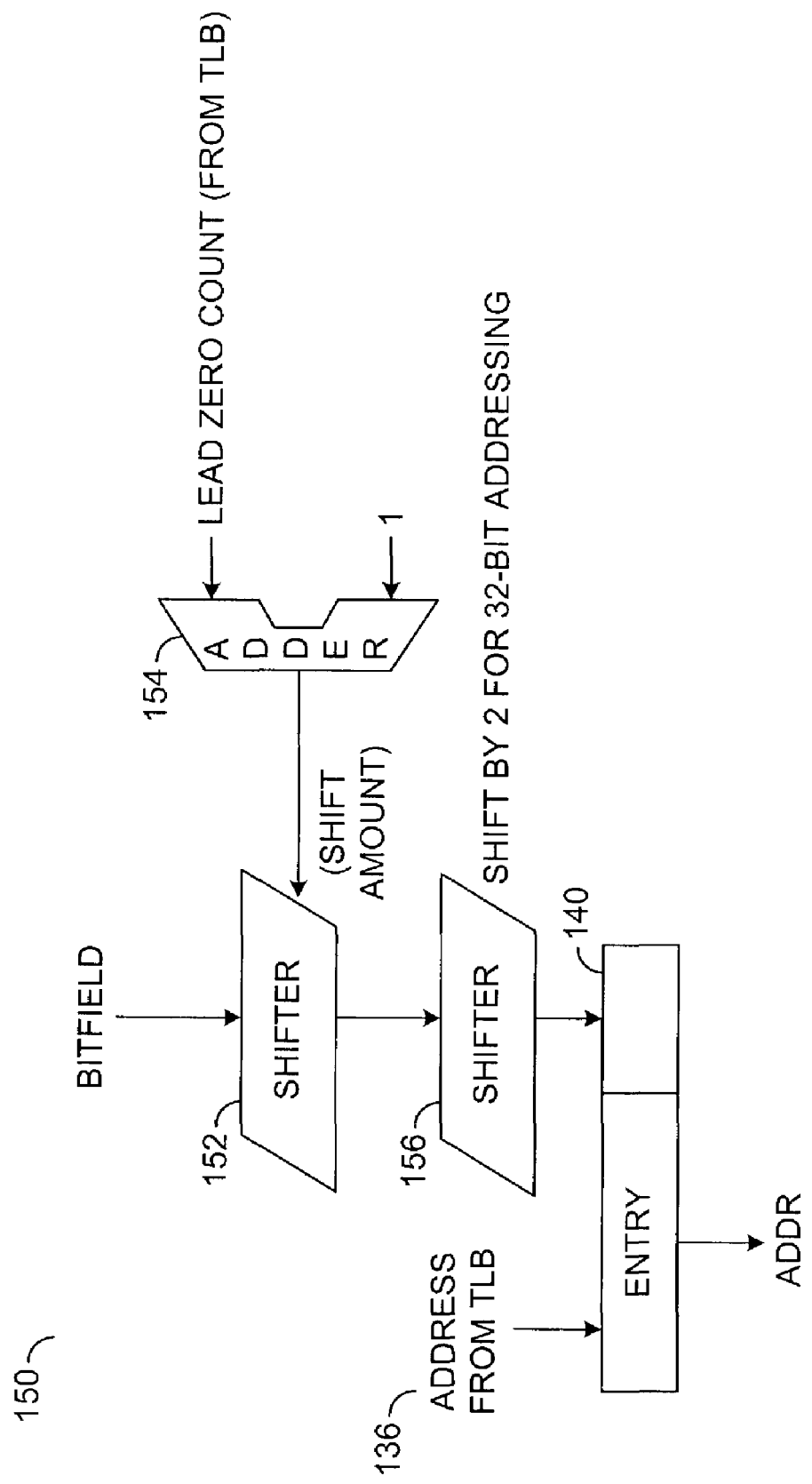
FIG. 4 is a flow diagram illustrating an example address translation process in accordance with a preferred embodiment of the present invention.

Referring to FIG. 4, a flow diagram is shown illustrating an example address translation process 150 that may occur in the address translation circuit 134. The address translation process 150 may receive the address 136 from the memory 132 (e.g., the TLB), the lead zero count from the TLB, and the signal BITFIELD. The address translation process 150 may comprise a shifter 152, an adder 154 and a shifter 156. The shifter 152 may shift the signal BITFIELD by a shift value determined by the adder 154. The adder 154 may determine the shift value by adding one to the lead zero count obtained from the TLB. The shifter 152 may provide a shifted version of the signal BITFIELD of the bit length provided by the TLB to the shifter 156. The shifter 156 may provide a final shift to the shifted version of the signal BITFIELD by an appropriate amount for the addressing scheme to be applied (e.g., the shifter 156 may shift by 2 for 32-bit addressing). The address translation process 150 may combine the address 136 from the TLB with the final shifted signal BITFIELD to produce the signal ADDR indicating the entry 140 in the table 138.

Figure 5:
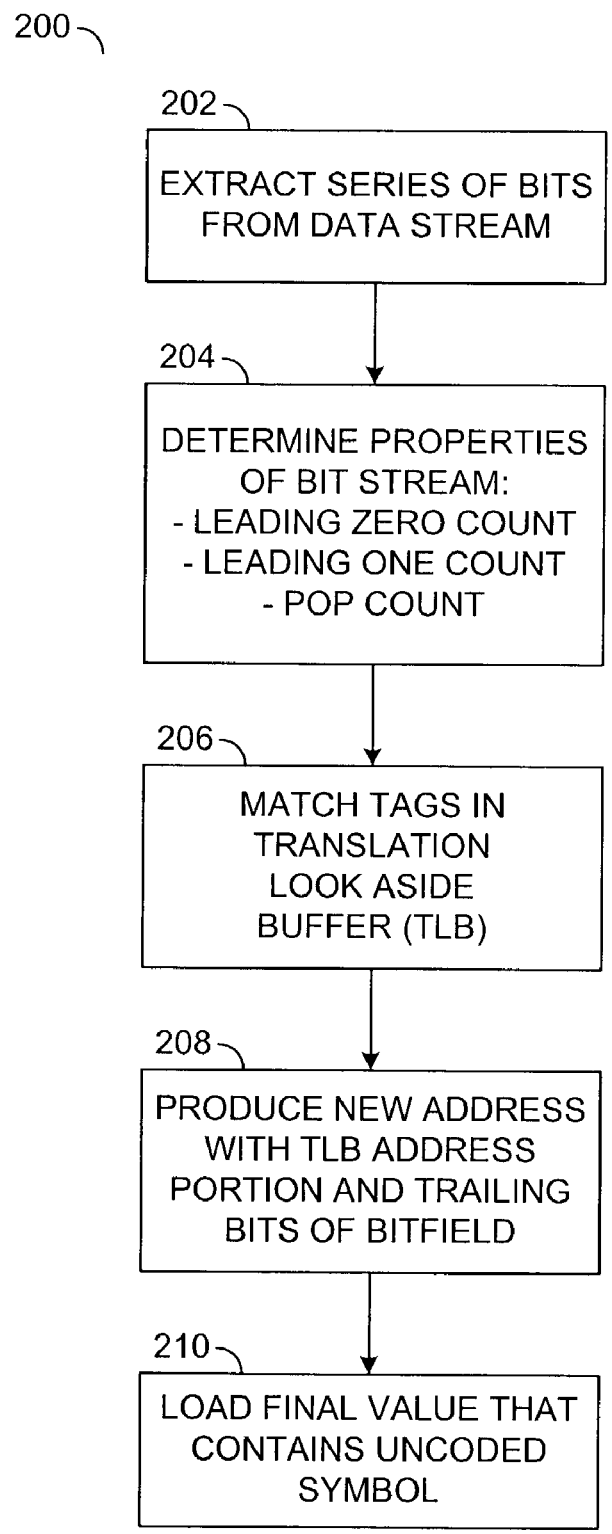
FIG. 5 is a flow diagram illustrating an example operation in accordance with a preferred embodiment of the present invention.

Referring to FIG. 5, a flow diagram 200 is shown illustrating an example logic (or process) in accordance with a preferred embodiment of the present invention. In one example, the process 200 may comprise a number of steps 202, 204, 206, 208, and 210. The step 202 may extract a series of bits (e.g., a bitfield) from a data stream. The data stream may comprise, in one example, an encoded and/or compressed digital video signal. The step 204 may determine properties of the bitfield. The properties may include the leading zero count, the leading one count, and/or the pop count. The step 206 may employ one or more of the properties determined during the step 204 to obtain an address. For example, the properties may be compared to tags in a content addressable memory (CAM) or a translation look-aside buffer (TLB) to obtain the address. The step 208 may combine the address obtained in step 206 with a portion of bitfield to generate a new address. The step 210 may apply the new address obtained in step 208 and load an unencoded symbol from the memory subsystem.

The function performed by the flow diagram of FIG. 5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product that may be a storage medium including instructions that can be used to program a computer to perform a process in accordance with the present invention. The storage medium can include, but is not limited to, any type of disk including floppy disk, optical disk, CD-ROM, and magneto-optical disks, ROMs, RAMs, EPROMS, EEPROMS, Flash memory, magnetic or optical cards, or any type of media suitable for storing electronic instructions.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for decoding using a general purpose processor, comprising the steps of:
   (A) extracting a bit field from a data stream;
   (B) extracting one or more properties from said data stream;
   (C) matching said one or more properties with one or more tags in a content addressable memory; and
   (D) generating a new address in response to said content addressable memory.

2. The method according to claim 1, further comprising the step of:
   loading a final value containing an uncoded symbol.

3. The method according to claim 1, wherein said method provides an increase in speed of variable length decoding of a video stream in general purpose processors.

4. The method according to claim 1, wherein said method implements a bit-oriented variable length decode process.

5. The method according to claim 1, wherein said one or more properties comprise a leading one count in a bit field, a leading zero count in a bit field, and a count of the number of ones in a bit field.

6. The method according to claim 1, wherein said method comprises an entropy coding stage of a streaming video compression process.

7. The method according to claim 1, wherein said method is implemented with a hardware acceleration structure and associated software instructions.

8. The method according to claim 1, wherein said method is amenable to high level software programming.

9. The method according to claim 1, wherein said method is easily adopted to multiple unique existing and future video codec standards.

10. The method according to claim 1, wherein step (A) comprises a bit field extraction stage.

11. The method according to claim 1, wherein step (B) comprises a bit field properties stage.

12. The method according to claim 1, wherein step (C) comprises a tag machine stage.

13. The method according to claim 1, wherein step (D) comprises an address generation stage.

14. The method according to claim 4, wherein said bit oriented variable length decode process executes an instruction in less than 5 clock cycles.

15. The method according to claim 3, wherein said video stream is selected from the group consisting of MPEG, H.26X variants, proprietary schemes from Microsoft, and proprietary schemes from Real Networks.

16. The method according to claim 1, wherein said general purpose processor is a RISC processor.

17. The method according to claim 1, wherein said content addressable memory comprises a translation lookaside buffer.

* * * * *